Figure 4:
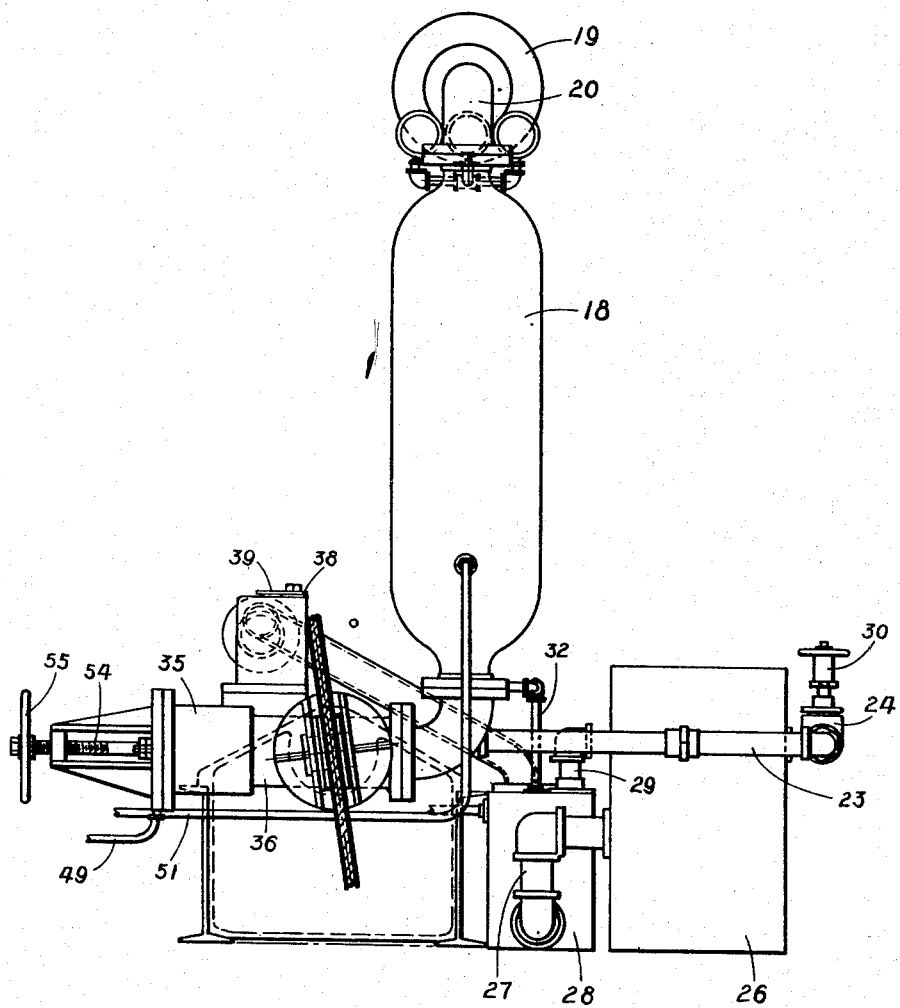

Sept. 21, 1948.                 C. L. HELBER ET AL                    2,449,554
                    HYDRO-PNEUMATIC ACCUMULATOR TYPE POWER PLANT
                            WITH DIFFERENTIAL SPEED MOTOR
Filed April 19, 1938                                        3 Sheets-Sheet 1
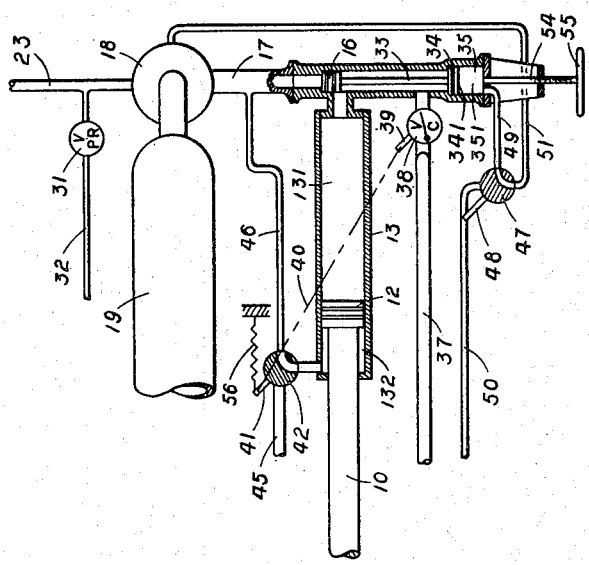
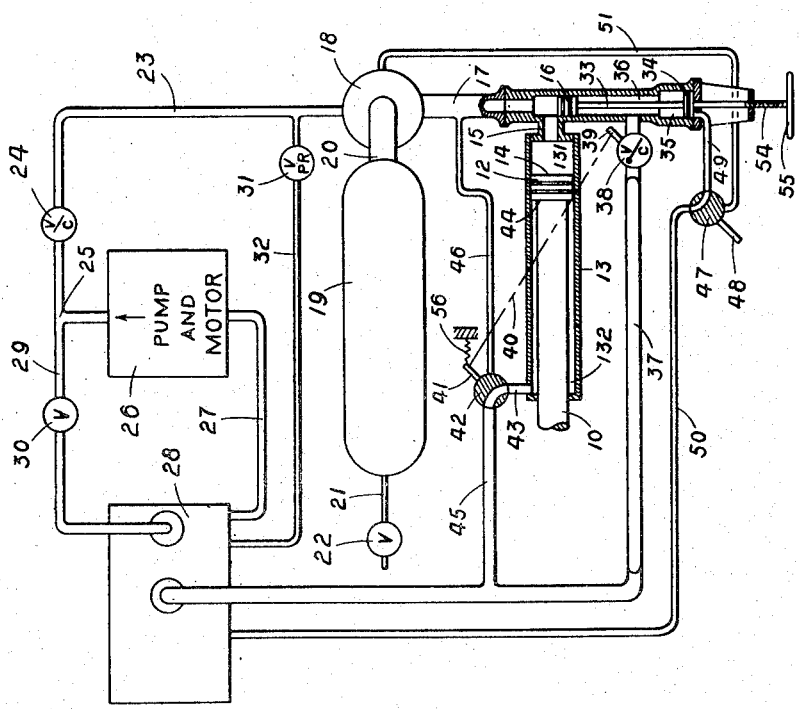
INVENTORS
CARLYLE L. HELBER
BY FREDERICK B. GROSS
ATTORNEY

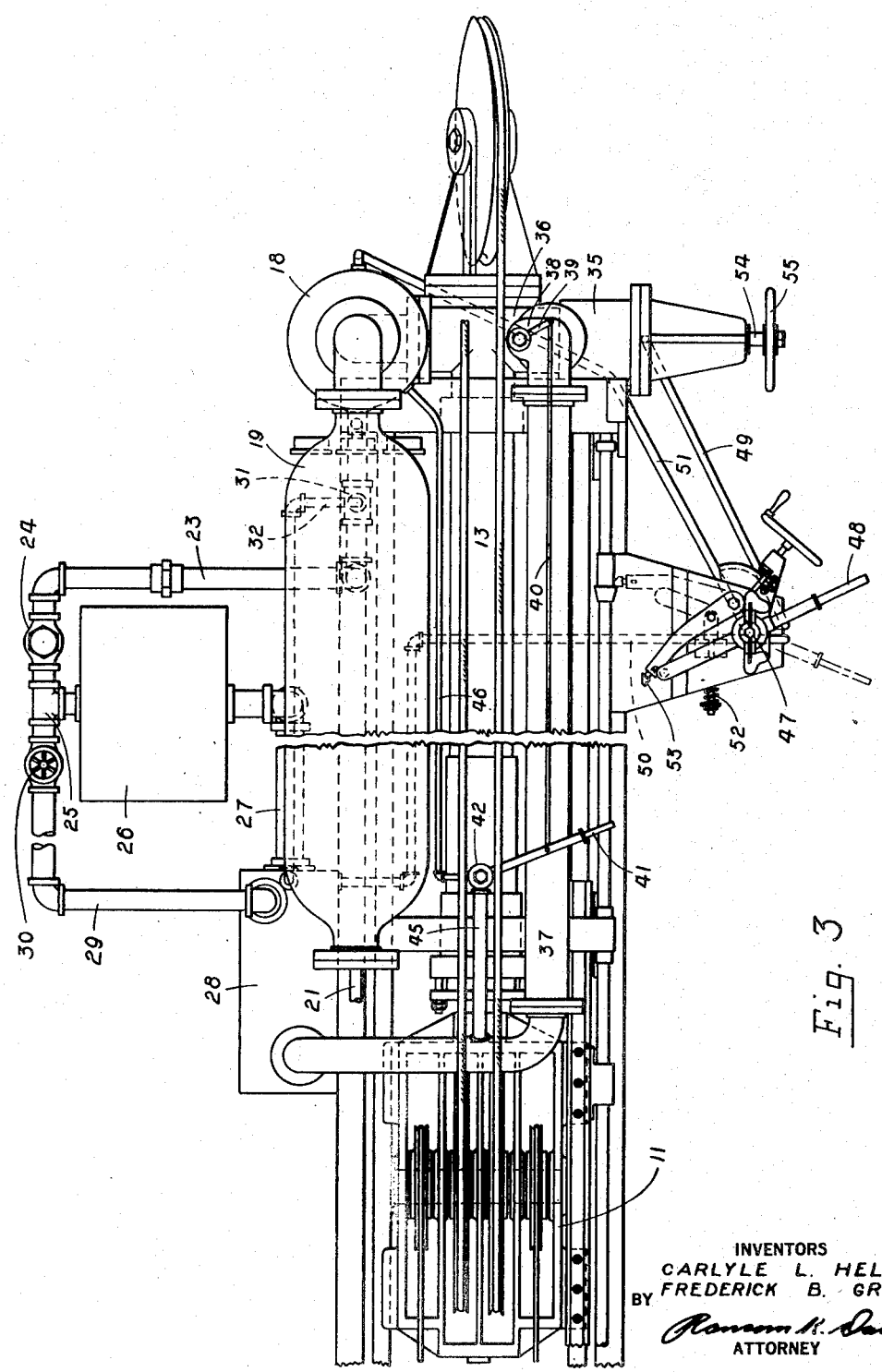

Sept. 21, 1948.     C. L. HELBER ET AL     2,449,554
HYDRO-PNEUMATIC ACCUMULATOR TYPE POWER PLANT
WITH DIFFERENTIAL SPEED MOTOR
Filed April 19, 1938     3 Sheets-Sheet 3

INVENTORS
CARLYLE L. HELBER
BY FREDERICK B. GROSS

ATTORNEY

Patented Sept. 21, 1948

2,449,554

UNITED STATES PATENT OFFICE 2,449,554

HYDROPNEUMATIC ACCUMULATOR TYPE POWER PLANT WITH DIFFERENTIAL SPEED MOTOR

Carlyle L. Helber, United States Navy, and Frederick B. Gross, Langley, Va.

Application April 19, 1938, Serial No. 202,898

2 Claims. (Cl. 60—51)

(Granted under the act of March 3, 1883, as amended April 30, 1928; 370 O. G. 757)

This invention relates to a power plant, and more particularly to a hydro-pneumatic accumulator type of power plant particularly useful in connection with an aircraft launching catapult.

A further object of this invention is to provide a power plant which may be used in place of the power plant disclosed in the copending application of Lisle J. Maxson and Frederick B. Gross, Serial No. 189,376, filed February 8, 1938, for Flush deck catapult, and is especially intended to operate the carriage of the catapult shown in that application. In that application pneumatic pressure is utilized as the sole engine-piston actuating means. In the present invention the engine-piston is actuated by hydraulic pressure which, in turn, is actuated by pneumatic pressure.

A further object of this invention is to provide a power plant for operating an engine-piston to move a reciprocable member with great force and at high speed in one direction and with little force and at slow speed in the opposite direction.

Still a further object of this invention is to provide a hydro-pneumatic power plant which may accumulate its power from a continuously operating pump and motor and which may expend its accumulated power intermittently.

With the foregoing and other objects in view, the invention consists in the construction, combination and arrangement of parts hereinafter described and illustrated in the drawings, in which Fig. 1 is a diagrammatic elevational view of the power plant of this invention just after the commencement of the power stroke, and Fig. 2 is a fragmentary view of Fig. 1 just after the commencement of the return stroke.

Fig. 3 is a top plan view of the power plant of this invention connected up to the engine carriage of a catapult; and Fig. 4 is a front elevational view of Fig. 3.

There is shown at 10 the piston power rod having at one end thereof the catapult carriage 11 and at the other end the piston 12, operable within a cylinder 13. Liquid may enter the chamber 131 of cylinder 13 against the face 14 of piston 12 by means of the neck 15 past the opened valve piston 16 from the pipe 17 of large cross-sectional area from hydraulic pressure tank portion 18. The liquid in the hydraulic pressure tank portion 18 of the fluid pressure accumulator means is kept under a desired high pressure by means of a pneumatic pressure tank portion 19 connected thereto by a pipe 20, pneumatic tank portion 19 having the air or gas therein replaceable when necessary through a pipe 21 and valve 22 from any suitable source of pressure.

Liquid expended from hydraulic tank portion 18 is restored thereto through pipe 23 having a check valve 24 connected by a T-joint 25 to a continuously operable pump and motor diagrammatically shown at 26. This pump and motor 26 are connected by pipe 27 to a liquid reservoir sump 28. The T-joint 25 is also connected by pipe 29 to the sump 28, and has an adjustable spring-loaded valve 30 therein. When used with a catapult for launching heavy aircraft, this spring-loaded valve 30 may be set at 3000 pounds per square inch. When used with extremely light aircraft it may be set as low as 1000 pounds per square inch. The pump 26 operates continuously and will pump liquid into the hydraulic pressure tank portion 18 until the pressure therein exceeds the setting of valve 30, when this valve 30 will open, allowing liquid to escape to the sump. Check valve 24 prevents liquid under pressure from escaping from tank portion 18. In case it is desired to launch a lighter aircraft after the valve has been set for heavier aircraft, the valve 30 will be set to the desired lower pressure and the pressure in tank portion 18 may be drained down to the desired lower pressure by means of the pressure reducing valve 31 in a pipe 32 connecting to the sump.

The valve piston 16 for connecting pressure line 17 to the cylinder neck 15 is itself mounted on one end of a connecting rod 33 whose other end is connected to a valve piston 34 of larger cross-sectional area and movable within the enlarged cylinder 35, connected to the cylinder 36 within which the valve 16 may operate. This cylinder 36 is connected by a humped pipe 37 to the sump 28, the hump in pipe 37 being provided to insure cylinder 36 remaining constantly full of liquid. In this manner the pressure in hydraulic tank portion 18 is quickly restored after a catapult shot and maintained at a predetermined value for the next shot. A check valve 38 is provided between hump 37 and cylinder 36 to insure that liquid may always flow from the hump 37 to the cylinder 36, but may not flow in an opposite direction except when the check valve is held open by means of its handle 39. This handle is connected by a link 40 to a handle 41 of a two-way valve 42 which connects a pipe 43 to the chamber 132 within cylinder 13 between the end of the cylinder and the back face 44 of the piston 12, the pipe 43 being connected through valve 42 to a sump line 45 or to a bottle neck pressure line 46 of small cross-sectional area. The cross-section of the sump line 45 is as great or greater than the cross-sectional area of the chamber behind the back face 44, so that liquid within the chamber 132 behind back face 44 may flow to the sump 28 without resistance.

A control valve 47 with a manual handle 48 is provided for controlling the operation of the power stroke of the piston rod 10. This control valve 47 is provided with a pipe 49 leading into the chamber 351 of cylinder 35 on the forward valve face 341 of piston valve 34, and connects this chamber 351 to either a sump line 50 or a pressure line 51 from pressure tank portion 18.

The valve 47 is substantially identical with the cocked control valve shown in the above-referred to application, and includes a spring 52 urging it toward the closed position shown in Fig. 2, but when open is held in such open position by means of a trigger 53 which is released when the carriage 11 approaches the end of its run, thus permitting the trigger 53 to be tripped and the valve 47 to return to the position connecting pressure line 51 to line 49 to move valve 34 and its connected valve 16 to closed position, thereby permitting the carriage 11 to have its momentum absorbed by a buffer without power being simultaneously applied thereto.

A threaded rod 54 and control wheel 55 extend into chamber 35 and may be threaded against forward piston face 341 of valve piston 34 to mechanically hold it in closed position when early operation of the power plant is not contemplated.

In operation, the threaded rod 54 is withdrawn to the position shown for permitting actuation of valve 34 and its connected valve 16. It is assumed that the pump and motor 26 have been operating sufficiently to place the liquid in tank portion 18 under the desired pressure, that tank portion 19 is filled with gas or air under the same pressure, and the piston 12 and connecting rod 10 are forward adjacent the neck 15. When ready for operation the valves 42 and 38 are in the position shown in Fig. 1, being held in such position by a spring 56. The valves 16, 34 and 47 are in the position shown in Fig. 2. With the aircraft connected to the catapult carriage and ready for flight, the handle 48 is moved from the position shown in Fig. 2 to the position shown in Fig. 1. The pressure against the forward face 341 of piston valve 34 may then escape through sump line 50, permitting the pressure from pressure tank portion 18 to flow freely and rapidly through pipe 17 and to open valve 16 and pass through neck 15 into chamber 131 against the forward face 14 of the power piston 12, actuating power rod 10 against carriage 11 at high speed. The liquid during the motion of piston 12 in chamber 132 behind the rear face 44 of piston 12 escapes through sump pipe 45 to sump 28. The movement of the handle 48 from the position shown in Fig. 2 to the position shown in Fig. 1 cocked the trigger 53. As the carriage 11 reaches the end of its run, it trips the trigger 53, permitting the valve 47 to be restored to the position shown in Fig. 2, thereby connecting the high pressure line 51 to the chamber 351 against forward face 341 of piston 34. The area on the valve piston face 341 being greater than that of the face of valve piston 16, valve piston 16 is moved to the closed position shown in Fig. 2, thus cutting off the pressure from tank portion 18 just at about the time that the carriage 11 strikes its momentum absorbing buffer. As the piston 12 continues traveling under momentum liquid from hump 37 flows into chamber 131 through check valve 38, thus preventing the creation of a vacuum within cylinder 13. With the momentum finally absorbed, check valve 38 closes, preventing liquid from flowing in the opposite direction back to the hump, thus preventing any rebound of the power rod 10 and carriage 11.

To restore the carriage 11 and power rod 10 to initial position, the handle 41 of valve 42 is held manually retracted against spring 56 connecting pressure line 46 to the chamber 132 against the back face 44 of piston 12 and opening valve 38. This will move the power rod 10 rearwardly toward the neck 15 at relatively slow speed because of the bottleneck effect of the small line 46. The liquid against the forward face 14 meantime drains through neck 15, cylinder 36, valve 38, and hump 37 to sump 28. When the piston 12 has reached the forward end at the neck 15, release of the handle 41 permits valve 42 and 38 to be automatically restored by means of spring 56 to the position shown in Fig. 1, ready for further operation of the power plant. The pump and motor 26 meantime having operated continuously, the liquid in tank portion 18 is restored from sump 28 and the power plant is ready for another cycle of operation.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

What we claim is:

1. A power plant comprising a hydro-pneumatic accumulator, a power cylinder, a piston therein having a piston rod projecting from one end of the cylinder, said piston and rod dividing the cylinder into a large area, high power chamber, and a small area, low power chamber, a conduit of large cross-sectional area connecting the liquid space of the accumulator to the high power chamber to move the piston and piston rod at high speed and high power, a sump, a pump for delivering liquid from the sump to the accumulator to maintain a predetermined pressure therein, an exaust conduit connecting the high power chamber to the sump, a check valve in the exhaust conduit opening to permit flow from the sump to the high power chamber, first valve means selectively operable to connect the high power chamber to the exhaust conduit or to the large area conduit, a passage of small cross-sectional area connecting the liquid space of the accumulator to the low power chamber, a large area passage connecting the low power chamber to the sump, second valve means selectively operable to connect the low power chamber to the small area passage or to the large area passage, and means responsive to movement of said second valve means to a position connecting the low power chamber to the small area passage for opening the check valve.

2. A power plant comprising a hydro-pneumatic accumulator, a power cylinder, a piston therein having a piston rod projecting from one end of the cylinder, said piston and rod dividing the cylinder into a large area, high power chamber, and a small area, low power chamber, a conduit of large cross-sectional area connecting the liquid space of the accumulator to the high power chamber to move the piston and piston rod at high speed and high power, a sump, a pump for delivering liquid from the sump to the accumulator to maintain a predetermined pressure therein, an exhaust conduit connecting the high power chamber to the sump, a hump in said exhaust conduit, a check valve in the exhaust conduit opening to permit flow from the hump to the high power chamber, to keep said high power chamber full at all times, first valve means selectively operable to connect the high power chamber to the exhaust conduit or to the large area conduit, a passage of small cross-sectional area connecting the liquid space of the accumulator to the low power chamber, a large area passage connecting the low power chamber to the sump, second valve means selectively operable to connect the low power chamber to the small area passage or to the large area passage, and means responsive to movement of said second valve means to a position connecting the low power chamber to the small area passage for opening the check valve.

CARLYLE L. HELBER.
FREDERICK B. GROSS.

REFERENCES CITED

The following references are of record in the file of this patent:

UNITED STATES PATENTS

| Number | Name | Date |
|---|---|---|
| 220,479 | Johnson et al. | Oct. 14, 1879 |
| 234,874 | Johnson | Nov. 30, 1880 |
| 361,778 | Reynolds | Apr. 26, 1887 |
| 403,187 | Gheen | May 14, 1889 |
| 410,184 | Ongley | Sept. 13, 1889 |
| 510,155 | Von Bühler | Dec. 5, 1893 |
| 551,350 | Dudley | Dec. 10, 1895 |
| 581,668 | Smith | Apr. 27, 1897 |
| 641,132 | Moore | Jan. 9, 1900 |
| 663,727 | Christie et al. | Dec. 11, 1900 |
| 760,195 | Green | May 17, 1904 |
| 764,522 | Crowe | July 5, 1904 |
| 794,882 | Pagenhart | July 18, 1905 |
| 868,718 | Smith | Oct. 22, 1907 |
| 898,365 | Holmes | Sept. 8, 1908 |
| 958,853 | Bulley | May 24, 1910 |
| 1,161,744 | Sparre | Nov. 23, 1915 |
| 1,172,356 | Haney | Feb. 22, 1916 |
| 1,619,474 | Hubbard | Mar. 1, 1927 |
| 1,622,029 | Dovel | Mar. 22, 1927 |
| 1,687,369 | Lapointe | Oct. 9, 1928 |
| 1,752,022 | Olsen | Mar. 25, 1930 |
| 1,787,328 | Schottler | Dec. 30, 1930 |
| 1,812,587 | Ellis | June 30, 1931 |
| 1,842,790 | Lindgren et al. | Jan. 26, 1932 |
| 1,895,710 | Ernst et al. | Jan. 31, 1933 |
| 1,909,659 | Clapp | May 16, 1933 |
| 2,072,488 | Stacy | Mar. 2, 1937 |
| 2,083,805 | Adams | June 15, 1937 |

FOREIGN PATENTS

| Number | Country | Date |
|---|---|---|
| 607,601 | France | Mar. 29, 1926 |